United States Patent [19]

Wan

[11] 4,158,822
[45] Jun. 19, 1979

[54] PHOSPHORESCENCE EXHIBITING MATERIALS FOR OPTICALLY PUMPED LASERS

[75] Inventor: Jeffrey K. S. Wan, Kingston, Canada

[73] Assignee: Canadian Patents and Development Limited, Ottawa, Canada

[21] Appl. No.: 926,308

[22] Filed: Jul. 20, 1978

[51] Int. Cl.² .................. H01S 3/20; C07F 7/08; C09K 11/06
[52] U.S. Cl. .................. 331/94.5 L; 252/301.17; 260/448.8 R
[58] Field of Search .................. 252/301.17, 301.18, 252/301.33; 331/94.5 L; 260/448.8 R

[56] References Cited

U.S. PATENT DOCUMENTS 3,913,033  10/1975  Tuccio et al. .................. 331/94.5 L

OTHER PUBLICATIONS

Rasuvaev et al., Chem. Abs., vol. 55, 20925b (1961).

Primary Examiner—F. C. Edmundson
Attorney, Agent, or Firm—Edward Rymek

[57] ABSTRACT

Chemical compounds resulting from the mixing of organosilanes and quinones in the presence of di-tert-butyl peroxide as a sensitizer, exhibit strong blue phosphorescence. These compounds are highly resistant to deterioration by heat and UV irradiation. The unique feature of enhanced phosphorescence quantum efficiency at high temperature makes these systems most suitable for solar pumped lasers which usually will operate at relatively high temperature.

30 Claims, 2 Drawing Figures

PHOSPHORESCENCE EXHIBITING MATERIALS FOR OPTICALLY PUMPED LASERS

BACKGROUND OF THE INVENTION

This invention is directed to a material which exhibits strong phosphorescence and the method of making the material. In particular this invention is directed to the reaction product of organic substituted silane and a quinone, the method of making the reaction product and an optically pumped laser which includes the reaction product as the active medium.

Optical pumping of lasers with solar energy represents a uniquely efficient means of collecting solar energy and such laser systems are particularly important in future development of energy, space and terrestrial communications.

While apparatus and methods have been designed for the optics of such solar pumped lasers, most present chemical lasing materials are only suited for use as conventional dye lasers which are operated at low pulse rates. The conventional laser dyes are not suitable for efficient operation by solar pumping in the continuous wave mode, as most of them will deteriorate after extended exposure to sunlight and heat, severly limiting the pulse rate and energy output. In addition, because of the heat generated during optical pumping, dye lasers have to be cooled or lose their efficiency. This factor limits the design of the apparatus and excludes the use of a permanent lasing tube. In general dyes deteriorate at high temperatures and under continuous irradiation and are therefore not suitable for pumping by high intensity solar energy.

SUMMARY OF THE INVENTION

It is therefore an object of this invention to provide materials which exhibit strong phosphorescence.

It is a further object of this invention to provide materials which are resistant to deterioration by irradiation.

It is another object of this invention to provide materials suitable for optically pumped lasers.

The phosphorescence exhibiting material consists of the reaction product of an organic substituted silane and a quinone. The silane is represented by the general formula $R_3SiH$, where each R is selected from the group consisting of H, an alkyl, and an aryl, at least one R being other than H. The quinone may be a para-benzoquinone, a para-napthaquinone or a para-anthraquinone or may be represented by the general formula:

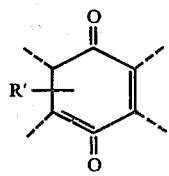

where R' is selected from the group consisting of an alkyl, an aryl and a halogen.

In the method of preparing the phosphorescent composition, the reaction components may be maintained at a temperature of between 50° C. and 70° C. during the reaction which may take place in the presence of a sensitizer such as di-tert-butyl peroxide which decomposes at 50° C. In addition, the reaction may be facilitated by dissolving the reactants in a non-reactive solvent such as benzene. The phosphorescent composition may be used as the active component of an optically pumped cw laser which includes a source of radiation such as a system for concentrating the sun's radiation and a resonant cavity formed by mirrors in which the phosphorescent composition is located and into which the radiation is directed.

DESCRIPTION OF THE PREFERRED EMBODIMENTS

Figure 1:
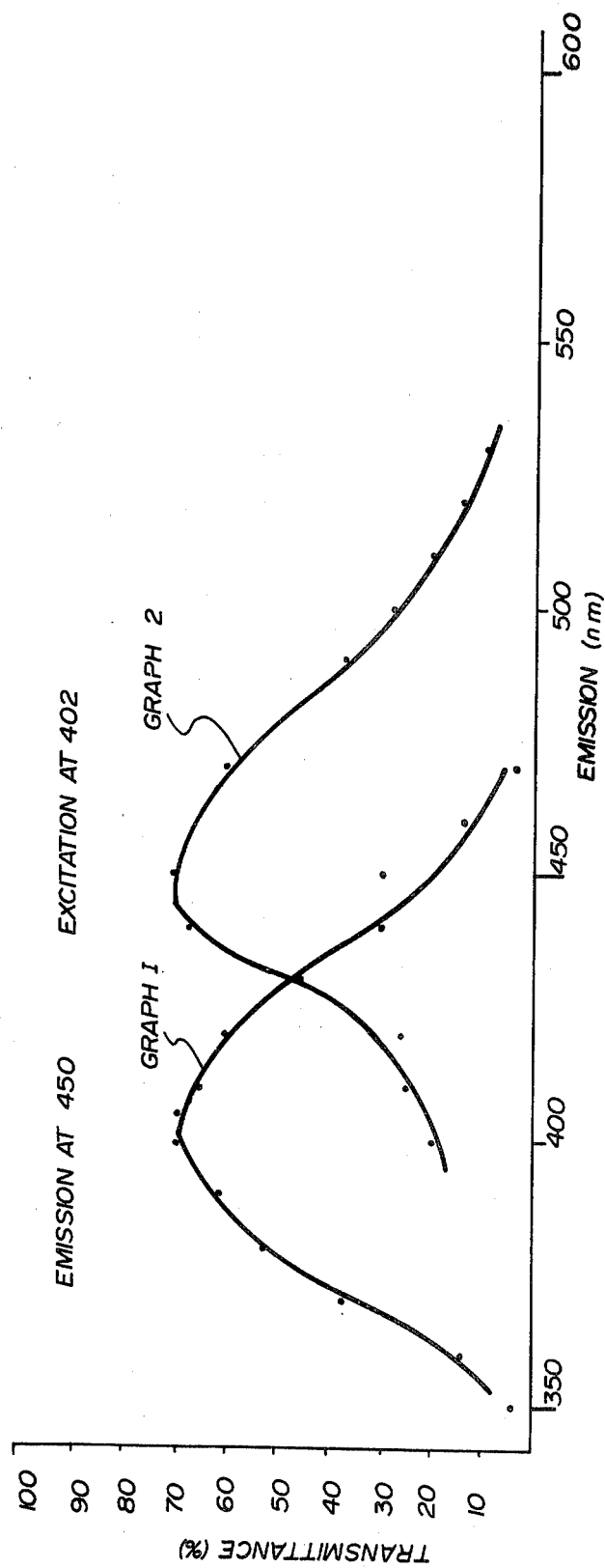
FIG. 1 is a graph of emission of the phosphorescent composition.

The material in accordance with the present invention which exhibits strong blue phosphorescence is the reaction product of the chemical reaction of an organic substituted silane and a quinone. The overall chemistry is complex, however the major relevant reactions can be represented in the following diagrams.

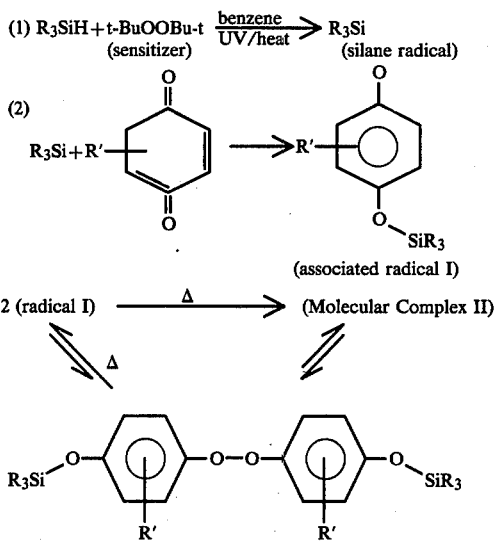

The organic substituted silane $R_3SiH$ molecule loses the hydrogen atom to form the silane radical $R_3Si$. This can occur at room temperature and if a liquid, it need not be in solution. However, it is usually preferrable to have the components in solution in a solvent which is relatively stable and nonreactive, such as benzene. In addition, though the silane forms a radical at room temperature, the process is rather slow and may be speeded up by heating the solution and/or applying UV to it. Since, both the silane and the benzene do not readily absorb radiation whether at the IR or UV end of the spectrum, a sensitizer is preferrably added to the solution. The sensitizer absorbs the radiation, decomposes and initiates the reaction. Most peroxides such as di-tert-butyl peroxide, improve the reaction substantially. The organic substituted silane is represented by the general formula $R_3SiH$ where each R may be a hydrogen H atom, an alkyl or an aryl group, at least one R being other than H. The preferred silanes for the above reaction, due mainly to availability, cost and state, are Trimethylsilane, Triethylsilane, Triphenylsilane, Diphenylsilane, Diphenylmethylsilane, and Dimethylphenylsilane.

The silane radical R₃Si as shown in the with a quinone radical to form the associated radical I on an equimolar basis. Though the reaction is equimolar it is preferred to have an excess of silane present. The quinone, preferably a para-quinone, is represented by the general formula

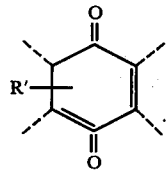

R' may simply be a hydrogen atom such that the quinone is benzoquinone. R' may alternately be one or two benzene rings such that the quinone is napthaquinone or anthraquinone respectively. Finally R' may be from the alkyl or aryl organic groups or even a halogen to provide a substituted quinone. The following substituted quinones have been used in the above reaction:

Tetrafluoro-p-benzoquinone
Tetrachloro-p-benzoquinone
2-methyl-p-benzoquinone
2,5-dimethyl-p-benzoquinone
2,6-dimethyl-p-benzoquinone
2,3,6-trimethyl-p-benzoquinone
Duroquinone (2,3,5,6-tetramethyl)
2-t-Butyl-p-benzoquinone
2,5-di-t-butyl-p-benzoquinone
2,6-di-t-butyl-p-benzoquinone
2-methyl-1,4-napthaquinone
2,3-dichloro-1,4-napthaquinone
2-methyl-9,10-anthraquinone
2-ethyl-9,10-anthraquinone
2-t-butyl-9,10-anthraquinone
1,4-dihydroxy-9,10-anthraquinone The third major reaction illustrated in the above diagram consists of two associated radical I molecules joining to form a molecular complex II. The reaction may follow two paths, the first of which takes place at low temperatures such as room temperature. The two radical I molecules form the molecule

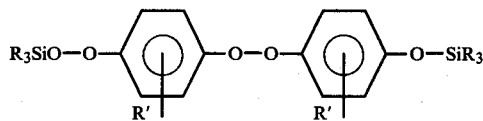

and this molecule adjusts its bonds to form the molecular complex II. However, at high temperatures, in the order of 50° C.–70° C., the two radical I molecules quickly and directly form the molecular complex II. From studies made on the reaction products in solution, it has been determined that the molecular complex II is the reaction product which exhibits strong phosphorescence. This has been done by removing the other components left in solution such as excess silane, or quinone, the sensitizer, the solvent, the radical I molecule and the complex molecule

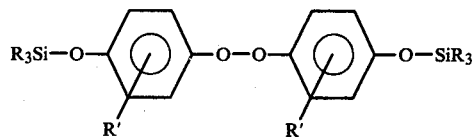

The exact structure of the molecular complex II has not been identified as complete isolation of the molecular complex has not yet been achieved, even with the use of electron spin resonance, however one structure postulated is formulated as

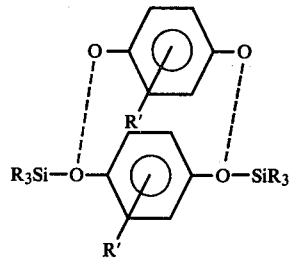

However, the reaction product which exhibits strong phosphorescence, does so in solution, and is stable. In addition, it is to be noted that since heat speeds up the reaction to achieve the phosphorescent product, the irradiation of the product with a broad spectrum such as sunlight enhances its phosphorescent characteristic rather than deteriorates it.

In a test of the reaction product of triethylsilane and para-anthraquinone, the product was maintained at a temperature of approximately 60° C. and continuously irradiated by a 200w UV lamp for a period of two weeks without any observable deterioration of its phosphorescence property. In addition many other samples of phosphorescent materials produced in accordance with this invention were kept at room temperature and in room light for five months, also with no observable deterioration.

The following are examples of the production of the phosphorescent material in accordance with the present invention.

EXAMPLE 1

5 mg of para-anthraquinone was reacted with 0.2 ml of triethylsilane in 2 ml of benzene solvent having 0.2 ml of the sensitizer di-tert-butyl peroxide. The reaction product exhibited phosphorescence under UV and visible irradiation. Graph 1 illustrates the absorption band of the material with a maximum of 402 nm. Graph 2 illustrates the emission band of the material when excited by UV radiation at 402 nm. The emission band has a maximum at 450 nm and the bandwidth is about 60 nm.

EXAMPLE 2

40 mg (0.192 mmole) of para-anthraquinone was reacted with 1.45 ml (7.8 mmole) of triethylsilane in 12 ml of benzene solvent having 1.45 ml (9.1 mmole) of the sensitizer di-tert-butyl peroxide. The solution was degassed, sealed and heated in a bath at 120° C. for 40 hrs. The solution exhibited strong blue phosphorescence.

EXAMPLE 3

624.66 mg (3 mmole) of para-anthraquinone was reacted with 1640.586 mg (6.3 mmole) of triphenylsilane in 40 ml of benzene and 921.249 mg (6.3 mmole) of di-tert-butyl peroxide. The solution was degassed and maintained at 120° C. for 40 hrs. The reaction product exhibited phosphorescence.

EXAMPLE 4

0.58 g (5 mmole) of triethylsilane was reacted with 103 mg (0.5 mmole) of anthraquinone in 8 ml of benzene and 0.73 g (5 mmole) of di-tert-butyl peroxide which resulted in a bluish yellow product.

EXAMPLE 5

0.792 g (5 mmole) of tripopylsilane was reacted with 103 mg (0.5 mmole) of anthraquinone in 8 ml of benzene and 0.73 g (5 mmole) of di-tert-butyl peroxide. The produce was again bluish-yellow.

EXAMPLE 6

0.58 g (5 mmole) of triethylsilane was reacted with 110 mg (0.5 mmole) of 2,6-di-t-butyl-p-benzoquinone in 8 ml of benzene and 0.73 g (5 mmole) of di-tert-butyl peroxide which resulted in a yellow product exhibiting strong blue phosphorescence.

EXAMPLE 7

0.58 g (5 mmole) of triethylsilane was reacted with 135 mg (0.5 mmole) of 2-methyl-1,4-napthaquinone in 8 ml benzene and 0.73 g (5 mmole) of di-tert-butyl peroxide. The product was again strongly phosphorescent.

In view of the fact that the reaction products exhibit a strong blue phosphorescence when irradiated and since the phosphorescence quantum efficiency is enhanced at high temperature, it is suitable as the active medium in an optically pumped laser. In particular, since the reaction product in accordance with this invention is highly resistant to deterioration by heat and/or UV irradiation, it is suitable as the active medium in a solar pumped laser.

Figure 2:
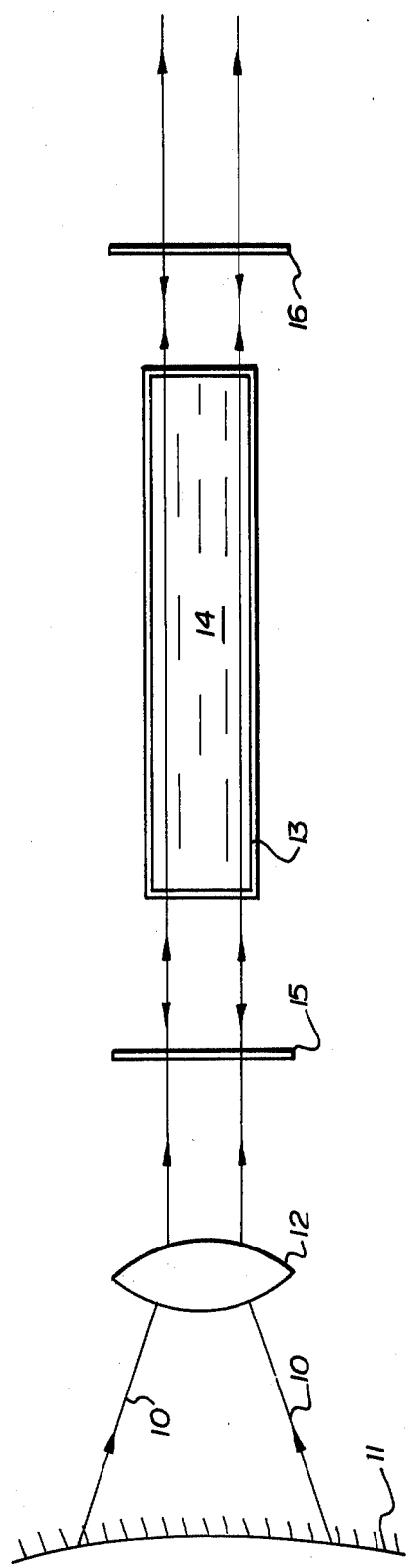
FIG. 2 illustrates a cw optically pumped laser in accordance with the invention.

FIG. 2 illustrates an optically pumped cw laser. The source of optical energy may be radiation 10 from the sun 11 which is concentrated via a lense 12 onto a chamber 13 containing the phosphorescent product 14 of this invention. The chamber 13 which is transparent at least at each of its ends is located in a resonant cavity formed by mirrors 15 and 16. Mirror 15 allows radiation 10 to enter the cavity however is totally reflective to light in the cavity. Mirror 16 is partially reflective or it may be replaced by grating for tuning the output frequency of the laser.

Chamber 13 may be completely sealed since the material 14 within the chamber need not be cooled. The material 14 may include only the reaction product which exhibits the strong phosphorescence or the reaction product in solution with the original solvent and sensitizer. In addition, the chamber 14 may be filled after the initial compounds have been reacted to form the strong phosphorescent material, or chamber 14 may be filled with the initial compounds, i.e. the silane, the quinone, the solvent and sensitizer and then sealed. The reaction can then be made to take place either in a location specifically designed or even after the chamber 14 is in place in the laser resonant cavity.

I claim:

1. A phosphorescent composition comprising the reaction product of an organic substituted silane and a quinone.

2. A phosphorescent composition as claimed in claim 1 wherein the organic substituted silane and the quinone are approximately equimolar.

3. A phosphorescent composition as claimed in claim 1 wherein the organic substituted silane is represented by the general formula $R_3SiH$ where each R is selected from the group consisting of H, an alkyl and an aryl, at least one R is not H.

4. A phosphorescent composition as claimed in claim 1 wherein the organic substituted silane is a trialkyl silane.

5. A phosphorescent composition as claimed in claim 1 wherein the organic substituted silane is selected from the group consisting of:

Trimethylsilane
Triethylsilane
Triphenylsilane
Diphenylsilane
Diphenylmethylsilane
Dimethylphenylsilane.

6. A phosphorescent composition as claimed in claim 1 wherein the quinone is a para-quinone.

7. A phosphorescent composition as claimed in claim 1 wherein the quinone is selected from the group consisting of parabenzoquinone, paranapthaquinone and para-anthraquinone.

8. A phosphorescent composition as claimed in claim 1 wherein the quinone is represented by the general formula:

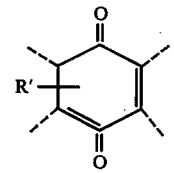

where R' is selected from the group consisting of an alkyl, an aryl and a halogen.

9. A phosphorescent composition as claimed in claim 8 wherein the quinone is selected from the group consisting of:

Tetrafluoro-p-benzoquinone
Tetrachloro-p-benzoquinone
2-methyl-p-benzoquinone
2,5-dimethyl-p-benzoquinone
2,6-dimethyl-p-benzoquinone
2,3,6-trimethyl-p-benzoquinone
Duroquinone (2,3,5,6-tetramethyl)
2-t-Butyl-p-benzoquinone
2,5-di-t-butyl-p-benzoquinone
2,6-di-t-butyl-p-benzoquinone
2-methyl-1,4-napthaquinone
2,3-dichloro-1,4-napthaquinone
2-methyl-9,10-anthraquinone
2-ethyl-9,10-anthraquinone
2-t-butyl-9,10-anthraquinone
1,4-dihydroxy-9,10-anthraquinone.

10. A phosphorescent composition as claimed in claim 1 wherein the reaction product has a Si—O bond.

11. A method of preparing a phosphorescent composition comprising reacting an organic substituted silane with a quinone to form the phosphorescent product.

12. A method as claimed in claim 11 wherein the reaction components are maintained at a temperature between 50° C. and 70° C. during the reaction.

13. A method as claimed in claim 12 wherein a sensitizer is mixed with the reaction components, the sensitizer being adapted to decompose at a temperature above 50° C.

14. A method as claimed in claim 13 wherein the sensitizer is a peroxide.

15. A method as claimed in claim 14 wherein the sensitizer is di-tert-butyl peroxide.

16. A method as claimed in claim 13 wherein the reaction components are dissolved in a solvent which is substantially unreactive.

17. A method as claimed in claim 16 wherein the solvent is benzene.

18. A method as claimed in claim 16 wherein the organic substituted silane is in a mole ratio equal to or greater than one/one with the quinone.

19. A method as claimed in claim 18 wherein the reaction yields a silane-oxygen bond.

20. A method as claimed in claim 18 wherein the organic substituted silane is represented by the general formula R₃SiH where each R is selected from the group consisting of H, an alkyl, and an aryl, and at least one R is not H.

21. A method as claimed in claim 20 wherein the organic substituted silane is selected from the group consisting of:

Trimethylsilane
Triethylsilane
Triphenylsilane
Diphenylsilane
Diphenylmethylsilane
Dimethylphenylsilane.

22. A method as claimed in claim 18 wherein the quinone is represented by the general formula

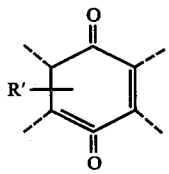

where R' is selected from the group consisting of an alkyl, an aryl and a halogen.

23. A method as claimed in claim 22 wherein the quinone is selected from the group consisting of Tetrafluoro-p-benzoquinone
Tetrachloro-p-benzoquinone
2-methyl-p-benzoquinone
2,5-dimethyl-p-benzoquinone
2,6-dimethyl-p-benzoquinone
2,3,6-trimethyl-p-benzoquinone  Duroquinone (2,3,5,6-tetramethyl)
2-t-Butyl-p-benzoquinone
2,5-di-t-butyl-p-benzoquinone
2,6-di-t-butyl-p-benzoquinone
2-methyl-1,4-napthaquinone
2,3-dichloro-1,4-napthaquinone
2-methyl-9,10-anthraquinone
2-ethyl-9,10-anthraquinone
2-t-butyl-9,10-anthraquinone
1,4-dihydroxy-9,10-anthraquinone.

24. An optically pumped laser comprising:
resonant cavity means;
a phosphorescent liquid material contained within the resonant cavity means; said material being the reaction product of an organic substituted silane and a quinone in a solvent; and
means for directing optical energy onto the phosphorescent material to excite the material sufficiently to sustain laser action.

25. An optically pumped laser as claimed in claim 24 wherein said optical energy directing means consists of means for focussing solar energy onto the phosphorescent material.

26. An optically pumped laser as claimed in claim 25 which includes means for maintaining the phosphorescent material at a temperature between 50° C. and 70° C.

27. An optically pumped laser as claimed in claim 25 wherein the organic substituted silane is represented by the general formula R₃SiH where each R is selected from the group consisting of H, an alkyl and an aryl, and at least one R is not H.

28. An optically pumped laser as claimed in claim 27 wherein the organic substituted silane is selected from the group consisting of:

Trimethylsilane
Triethylsilane
Triphenylsilane
Diphenylsilane
Diphenylmethylsilane
Dimethylphenylsilane.

29. An optically pumped laser as claimed in claim 25 wherein the quinone is represented by the general formula:

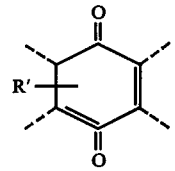

where R' is selected from the group consisting of an alkyl, an aryl, and a halogen.

30. An optically pumped laser as claimed in claim 29 wherein the quinone is selected from the group consisting of:
Tetrafluoro-p-benzoquinone
Tetrachloro-p-benzoquinone
2-methyl-p-benzoquinone
2,5-dimethyl-p-benzoquinone
2,6-dimethyl-p-benzoquinone
2,3,6-trimethyl-p-benzoquinone
Duroquinone (2,3,5,6-tetramethyl)
2-t-Butyl-p-benzoquinone
2,5-di-t-butyl-p-benzoquinone
2,6-di-t-butyl-p-benzoquinone
2-methyl-1,4-napthaquinone
2,3-dichloro-1,4-napthaquinone
2-methyl-9,10-anthraquinone
2-ethyl-9,10-anthraquinone
2-t-butyl-9,10-anthraquinone
1,4-dihydroxy-9,10-anthraquinone.

* * * * *

UNITED STATES PATENT AND TRADEMARK OFFICE
CERTIFICATE OF CORRECTION

PATENT NO. : 4,158,822
DATED : June 19, 1979
INVENTOR(S) : Jeffrey K.S. Wan

It is certified that error appears in the above-identified patent and that said Letters Patent are hereby corrected as shown below:

Column 1, line 54; column 3, line 11; and Claims 8, 22, and 29, the formula should read:

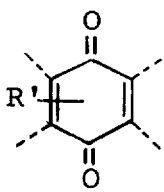

Column 2, line 29, that portion of the formula reading:

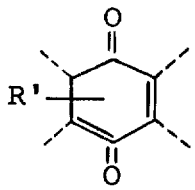   should read   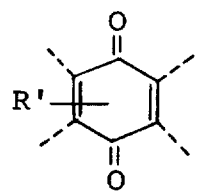

Column 3, line 53, the left hand portion of the formula reading $R_3SiO-O-$ should read $R_3Si-O-$.

Signed and Sealed this

Second Day of October 1979

[SEAL]

Attest:

RUTH C. MASON
Attesting Officer

LUTRELLE F. PARKER
Acting Commissioner of Patents and Trademarks